United States Patent [19]

Eigel

[11] 3,962,554
[45] June 8, 1976

[54] ELECTRICAL INSULATION PROTECTOR MEANS

[75] Inventor: James Anthony Eigel, Claremont, N.C.

[73] Assignee: Superior Continental Corporation, Hickory, N.C.

[22] Filed: Apr. 2, 1975

[21] Appl. No.: 564,496

[52] U.S. Cl. .................. 174/74 A; 21/60.5 R; 21/DIG. 2; 150/52 R; 174/135; 206/205
[51] Int. Cl.² ...................................... H02G 15/02
[58] Field of Search ................ 174/10, 14 R, 23 R, 174/23 C, 74 R, 74 A, 77 R, 77 S, 87, 135, 138 F; 150/1, 52 R; 252/404; 206/205, 207, 211; 312/31.1; 339/114, 115 R, 115 C, 116 R, 116 C; 285/45; 21/2.5 B, 58, 60.5 R, 60.5 A, 78, 103, DIG. 2

[56] References Cited
UNITED STATES PATENTS

| | | | |
|---|---|---|---|
| 2,708,123 | 5/1955 | Risley et al. | 285/45 |
| 3,061,549 | 10/1962 | Dickey | 206/205 X |
| 3,427,392 | 2/1969 | Plummer | 174/138 F X |
| 3,507,977 | 4/1970 | Pusey | 174/87 |
| 3,668,298 | 6/1972 | Hawkins | 174/23 C |
| 3,670,874 | 6/1972 | Brunner | 206/205 |
| 3,856,980 | 12/1974 | Puckowski et al. | 174/23 C |
| 3,879,575 | 4/1975 | Dobbin et al. | 174/87 |

FOREIGN PATENTS OR APPLICATIONS 16,972    1898    United Kingdom............... 174/74 A

*Primary Examiner*—Laramie E. Askin
*Attorney, Agent, or Firm*—Roy B. Moffitt

[57] ABSTRACT

Deterioration of most telephone conductor plastic insulation is restricted to that insulation exposed to the atmosphere. To alleviate this problem, there is disclosed a bag-like first enclosure adapted to be fitted around the terminal portion of a cable terminus from which a plurality of plastic insulated conductors protrude. Either affixed to an inner wall or to one or more of the protruding conductors is a second enclosure that is perforated and contains an antioxidant. Alternatively, the sidewalls of the first container can be made of laminated plastic, the innermost laminate of the laminated sidewall containing 1–50% by weight of an antioxidant.

4 Claims, 7 Drawing Figures

ELECTRICAL INSULATION PROTECTOR MEANS

BACKGROUND OF THE INVENTION

Telephone cable is generally composed of three basic parts, a core, a shield and a jacket. In "PIC" telephone cable (Polyethylene insulated cable), the jacket is made of extruded polyolefins (usually polyethylene) and the core is made up of a plurality of insulated electrical conductors, the insulation usually being made of the same or similar material as the jacket. The jacket (usually an outer jacket) normally contains a significant amount of carbon black. It is thought that because of this carbon black, exposure of a polyethylene jacket to the atmospheric elements, particularly sunlight, does not significantly result in its degradation. On the other hand, this is not the case with the insulated electrical conductors that make up the core. They ordinarily contain a pigment other than carbon black.

For the purpose of identification, it is desirable and the usual practice is to have different colors of insulation for the insulated electrical conductors that make up the cable core. Except for the color black (usually derived from carbon black), it has been found that when exposure to atmospheric elements, the polyolefin, e.g., polyethylene, used for the conductor insulation, significantly deteriorates (splits, cracks, embrittles) over a period of time. Since each and every one of these insulated conductors, except the black ones, contain Rutile ($TiO_2$) it has been advanced that Rutile contributes towards this tendency to degrade in most environments.

To combat this degradation, attempts have been made to stabilize the insulation on the conductors with what is known as an antioxidant. An example of such antioxidant is a material sold underneath the trademark "SANTONOX" and is chemically known as 4,4' thiobis (6-tertiary butyl-3-methyl phenol). Prior to 1959, this antioxidant was used at 0.05% by weight concentration and after the middle of 1962, 0.1% by weight. In all known cases to date, this antioxidant has been mixed in with the polyethylene and such mixture extruded simultaneously while the insulation was being placed on the conductors. Another example of an antioxidant is tetrakis [methylene (3,5-di-t-butyl-4-hydroxyhydrocinnamated)] methane, sold under the trade name IRGANOX-1010.

For the purpose of this disclosure and appended claims, the term antioxidant is used herein to mean any chemical component normally existing in the solid state at conditions of standard temperature and pressure (STP) that will neutralize or otherwise combine with to so neutralize free radicals and/or ionization products that a polyolefinic polymer would otherwise form under conditions other than and including STP while such polymer is seeking a lower level of free energy.

PRIOR ART

Many investigators have investigated the mechanisms of antioxidants and the role they play regarding the degradation of electrical insulation. Some of the more prominent ones being as follows: John B. Howard as reported in the "21st Annual International Wire and Cable Symposium, 1972"; B. D. Gesner et al in the "22nd Annual International Wire and Cable Symposium, 1973," and Pusey et al in the same publication published in 1971. All of these investigators dealt with the concept that an antioxidant must be combined with the polyethylene conductor insulation. Pusey et al investigated the loss of antioxidant in still vs. moving air and came to the conclusion that loss of antioxidant by evaporation from the surface of the insulation into the air within a given splicing enclosure is not the primary cause of insulation degradation, but that the presence of Rutile (Titanium Dioxide) pigment within the insulation and the presence of copper conductor beneath the insulation were the major causes of degradation.

FIELD OF THE INVENTION

The particular focus of the present invention is where a telephone cable terminates, for example, in a pedestal or splice case. Deterioration is not usually found in plastic conductor insulation where a jacket surrounds it. For splicing purposes, a significant length of the individual conductors must be exposed, and it is here that the individual plastic insulated electrical conductors are exposed to the general atmospheric and temperature conditions. By use of the invention, the life of the insulation of the plastic insulated electrical conductors exposed beyond the terminal edge of the cable jacket is prolonged significantly.

SUMMARY OF THE INVENTION

One embodiment of the present invention is composed of a first bag adapted to be disposed around the terminus of a plurality of plastic insulated electrical conductors, such conductors usually having an unexposed portion circumscribed by a plastic jacket, such a combination forming a cable. The sidewalls of the bag, by use of a "B-sealing tape"(explained more fully below) and a clamp, are securely fastened to the cable jacket, thereby forming a static enclosure around the terminal portion of the cable, i.e. the exposed plastic insulated electrical conductors. There is disposed in the thus formed enclosure a second bag, such being perforated, much on the order as the common ordinary teabag. This additional enclosure (second bag) can be either attached to the plastic insulated electrical conductor (by a string for example) or affixed to the inner wall of the first bag. Disposed inside the second bag is a quantity of antioxidant, that exhibits some degree of volatility.

Another embodiment envisions a bag somewhat similar to that of the first embodiment described above; however, this particular bag is made up of laminated plastic layers, one laminate of which (the innermost layer) contains a very high concentration of antioxidant (at least 1% by weight), for example somewhere in the neighborhood of 1–50% by weight. The bag is disposed over a cable terminus much in the same manner as that described in the first embodiment.

A still further embodiment, a variation of the previous embodiment, employs the same laminated structure as that described above, except that a metal foil lamina is disposed between and securely affixed to the aforementioned laminae.

One object of the present invention is to provide a means of slowing down the degradation of the plastic insulation on insulated electrical conductors when such are exposed to the atmosphere.

Other objects, advantages and features of the present invention will become apparent from the following detailed description, the elements of which are presented in conjunction with the drawing, viz:

DESCRIPTION OF THE PREFERRED EMBODIMENT

Figure 2:
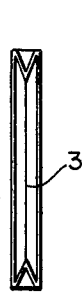
FIG. 2 shows the top portion of the bag of FIG. 1, such being unsealed.
Figure 1:
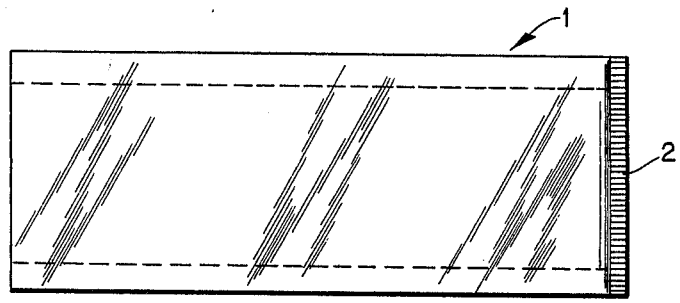
FIG. 1 shows an outside surface view of an ordinary plastic bag, its sidewalls being constructed of single or multiple preforms (laminae), the bottom portion being sealed and the top portion being open.
Figure 3:
FIG. 3 shows the bottom portion of the bag in FIG. 1, such being sealed in a conventional manner.
Figure 4:
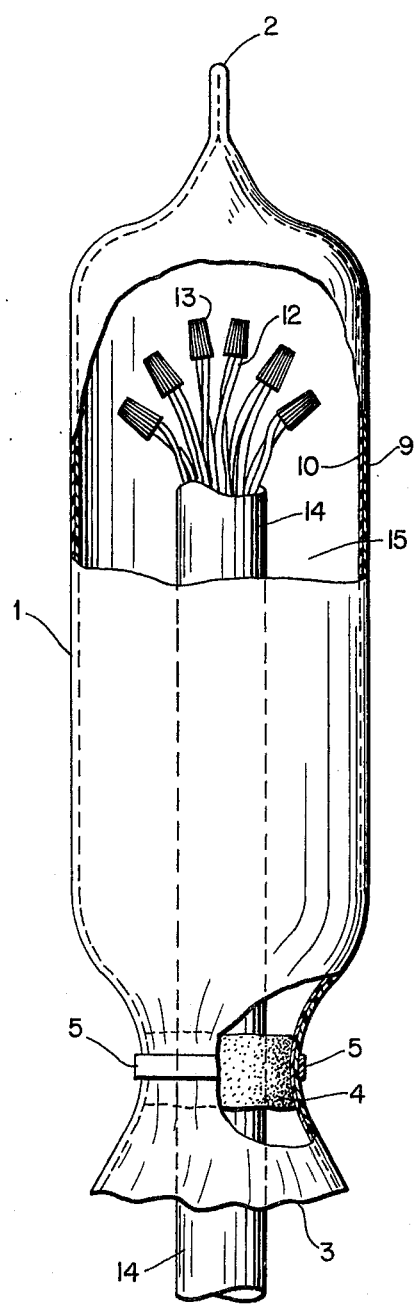
FIG. 4 shows a bag of FIG. 1 made of the material of the embodiment shown in FIG. 5 and disposed around a cable terminus much in the manner as shown in FIG. 7.

Element 1 of FIG. 1 shows a plastic bag that forms a portion of the instant invention, such having a sealed bottom 2 (FIG. 3) and an open top 3 (FIG. 2). The bag itself can be of ordinary polyethylene or polypropylene or polyvinyl chloride and can be of one layer or a plurality of layers. See FIGS. 5 and 6. A non-laminate type bag is usually employed with the embodiment shown in FIG. 7. In this Figure there is shown an outer jacket 14 (polyethylene) of a conventional telecommunications cable, and protruding from the terminal edge of the jacket a plurality of plastic (polyolefin) insulated electrical conductors 12. The plastic insulated electrical conductors terminate and the terminal portions are then capped by conventional plastic caps 13, usually joining two electrical conductors together to provide electrical continuity (electrical connection). The bag of FIG. 1, element 1, is slipped over the terminal portion of the cable 14 and the plastic insulated electrical conductors 12 with the sealed portion of the bag 1 facing the plastic insulated electrical conductors 12 and the open portion of the bag circumscribing the cable jacket 14. As shown in FIG. 4, "B-sealing tape" (polyisobutylene), element 4, is disposed between the bag and the cable jacket. The sidewalls of the bag 1 are then gathered about the B-sealing tape and a retaining means, such as plastic band or wire (element 5), is tightly disposed around the outer surface of the bag forcing the sidewalls of the bag into the B-sealing tape and forming an air tight seal, thus creating an air tight enclosure 15. Disposed on the interior or the bag 1 (still referring to FIG. 7) is either one or both of additional bag or bags 11 and 11a. Both 11 and 11a are filled with antioxidant and the bags themselves (11 and 11a) are perforated so as to retain the antioxidant but not to retain any gases or volatile matter the antioxidant may generate.

With respect to bags 11 and 11a, both are generally of the same construction, i.e. either of plastic, metal or paper or some other suitable container into which an antioxidant can be disposed. Furthermore, the bags should be perforated to allow any vapors of the antioxidant to escape. With respect to the embodiment shown by element 11a, a string or other attachment means can be affixed to the bag at one end and then the other end of the attachment means affixed to one of the plastic insulated electrical conductors. Alternatively, the bag can be adhered to the inner surface of bag 1. In either embodiment, the same results are achieved.

Figure 5:
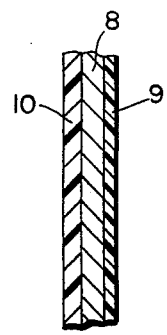
FIG. 5 shows an embodiment of the invention, more particularly a cross section of the sidewalls of the bag of FIG. 1.
Figure 6:
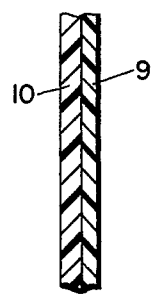
FIG. 6 shows another embodiment of the invention, namely the cross section of the sidewalls of the bag of FIG. 1.

The particular bag side wall configurations shown by FIGS. 5 and 6 (cross-sections of particular bag sidewall constructions) are used in that embodiment described by FIG. 4.

Figure 7:
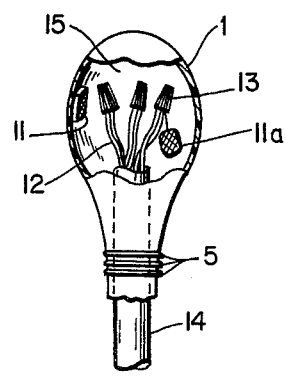
FIG. 7 shows still another embodiment of the invention using a "tea bag" bag disposed on the inside of the bag of FIG. 1 and affixed to the inner sidewall of the bag of FIG. 1 and/or to an exposed insulated conductor.

This embodiment is broadly the same as that embodiment shown in FIG. 7, except for bags 11 and 11a which are deleted. In this embodiment (FIG. 4), bag 1 is disposed over the cable terminus 14 with a plurality of protruding plastic insulated electrical conductors, shown here segregated into pairs and capped by plastic caps 13. The sidewalls of the bag 1 forming the open terminus 3 are gathered about the cable jacket 14 and are disposed over a do-nut shaped B-sealing tape with a band 5 disposed on the outer portion of the bag 1 to form a tight seal therewith. Such a construction creates an open enclosure 15 in the same fashion as that shown in FIG. 7. The distinction between the embodiment of FIG. 4 and FIG. 7 is in the wall construction of the bag itself and the absence of a second enclosure 11 or 11a. Possible sidewall constructions of the embodiment of FIG. 4 are those of FIGS. 5 and 6. For purposes of example, the bag wall construction of FIG. 6 is shown in FIG. 4. However, it is to be expressly understood that a bag wall having the cross section of FIG. 5 can also be used in FIG. 4.

Referring now to FIG. 5, element 9 is an ordinary piece of plastic, e.g. a polyolefin, which may or may not have disposed in it an antioxidant. This plastic preform is laminated and firmly affixed to element 8 which is a preform of metal foil, e.g. copper, aluminum and the like. Plastic preform 10 is also firmly affixed to metal foil 8. Plastic preform 10 is an ordinary piece of plastic (polyethylene or polypropylene) containing at least 1% by weight of an antioxidant, for example 1–50% by weight. Plastic preforms 9 and 10 are adhered to metal foil preform 8 by any of the well known conventional methods, for example that method described in U.S. Pat. No. 3,233,036. Plastic preform 9 may or may not have an antioxidant disposed in it. If it does, it is unnecessary for it to have the same concentration as element 10. Normally, the one tenth of one percent could be sufficient to keep this plastic from deteriorating.

The only difference between the bag sidewall constructions shown in FIGS. 5 and 6 is the metal foil preform 8. Such is used in the bag sidewall construction shown in FIG. 5, and is not used in the bag sidewall construction shown in FIG. 6. Concentrations of antioxidant in elements 9 and 10 of FIG. 6 are not the same respectively as that shown in FIG. 5.

In using any of the embodiments of the invention, the deterioration of plastic surrounding electrical conductors, be they for power or intelligence carrying, has been drastically reduced. In fact, experimental results show that by using the invention, plastics used for insulation of electrical conductors have outlasted by 20 times plastic insulated conductors not so treated, and the treated ones have yet to fail at this writing. Heretofore, prior investigators had assumed that the way to attack polyolefinic deterioration when exposed to the atmosphere was one of the following: (1) use of carbon black or (2) use of antioxidants, both of the aforementioned being disposed inside the plastic itself. No investigator to applicant's knowledge has ever suggested that placing an antioxidant in an enclosed chamber and exterior to the plastic to be protected would retard deterioration. The instant invention not only solves the problem of polyolefinic deterioration for plastic insulated electrical conductors yet to be manufactured and placed into service, it also provides a means whereby the life of plastic insulated electrical conductors presently in the field (installed) can be prolonged by a simple expedient of placement of a bag around them and disposing an antioxidant in such a bag exterior from them. Bag 1 can be one which contains carbon black in similar amounts as cable jacket 14. Such a construction has generally the same effect as a black cable jacket on rate of deterioration of the plastic insulated electrical conductors disposed therein.

I claim:

1. First and second bags, said second bag being perforated, containing an antioxidant and disposed on the interior of the first bag, at least one plastic insulated electrical conductor protruding into the interior of the first bag and at least a portion of the sidewalls of the first bag being gathered about the periphery of the insulated electrical conductor to form an enclosed space about that portion of the insulated electrical conductor protruding into the first bag.

2. The combination of claim 1 wherein said antioxidant is selected from the group consisting essentially of 4,4'thiobis(6-tertiary butyl-3-methyl phenol) and tetrakis [methylene (3, 5-di-t-butyl-4-hydroxyhydrocinnamate] methane.

3. First and second bags, the second bag being perforated, containing an antioxidant and disposed on the interior of the first bag; at least one tubular plastic jacket a portion of which protrudes into the interior of the first bag; at least one plastic insulated electrical conductor circumscribed in part by the tubular plastic jacket protruding into the first bag and at least a portion of the sidewalls of the first bag gathered about the periphery of the tubular plastic jacket and affixed thereto to form an enclosed space around that portion of the plastic jacket protruding into the first bag.

4. The combination of claim 3 wherein said antioxidant is selected from the group consisting essentially of 4,4' thiobis (6-tertiary butyl-3-methyl phenol) and tetrakis [methylene (3) 5-di-t-butyl-4-hydroxyhydrocinnamate)] methane.

* * * * *